PREPARATION OF ALKALI METAL DICYANAMIDES

George V. Vosseller, Niagara Falls, N.Y., assignor to Nilok Chemicals, Inc., Lockport, N.Y.
No Drawing. Filed Aug. 23, 1966, Ser. No. 574,301
U.S. Cl. 23—78      7 Claims
Int. Cl. C07c 129/14

The present invention relates generally to the preparation of alkali metal dicyanamides, and more specifically to a straightforward method of preparing alkali metal dicyanamides directly from the corresponding alkali metal hydroxide, and a cyanogen halide. The alkali metal dicyanamide is produced in good yield and purity, and is essentially free from unwanted nitrogenous and halogenated substances.

Heretofore the water soluble alkali metal salts of dicyanamide have been prepared by methods that are not entirely satisfactory because the cyanamide compound must first be made and then separated, involving several additional processing steps prior to the synthesis of the dicyanamide. Also, if the conditions of the reactions used to make the dicyanamide salt are not closely controlled, sodium carbonate, dicyano diamide or other undesirable products may form, resulting in loss of yield and increasing the problems of separation and purification of the desired alkali metal dicyanamide.

Since these dicyanamide compounds are useful chemical intermediates in the manufacture of such products as dyes, paper preservatives, pharmaceuticals and other therapeutic agents, it would be desirable to provide a direct, economical synthesis thereof from readily available starting materials.

It is the primary object, therefore, of this invention to provide a straightforward, direct method for preparing alkali metal dicyanamides from readily available commercial reactants. It is a further object of this invention to prepare alkali metal dicyanamides by a most direct and economical method that can also be used for the continuous production of dicyanamides for commercial use. These and other objects will become apparent from a consideration of the following description and examples.

In accordance with the invention, this is accomplished through reaction of the alkali metal hydroxide and a cyanogen halide with aqueous ammonia. More specifically, a given amount of aqueous ammonia solution is placed in a suitable reaction vessel equipped with a stirrer, recycle pump, or other agitation device and with some means of keeping the vessel and its contents cold. The vessel should have an open top or some means whereby the resulting ammonium chloride can be removed from the reaction as it is made. After the ammonia solution has been cooled to about 0° C.–10° C. the gaseous or liquid cyanogen halide is introduced into the solution through a suitable inlet located below the surface level of the ammonia solution. The alkali metal hydroxide is added, in solution, concurrently with the cyanogen halide, the rate of addition being about in the proportion of one mol of the alkali metal hydroxide to one mol of the cyanogen halide. Also, the rate of addition of the cyanogen halide is controlled so that the temperature of the reaction mass is kept below about 35° C. and preferably below about 30° C.

Due to the nature of the reactants and products the pH of the reaction mass will automatically be maintained at a high alkaline level, such as about 9.0 or higher, until the consumption of ammonium hydroxide is substantially complete at which time the pH drops, and the reaction can be continued until the pH of the reaction mass falls to an acid level, such as about 5.6, the drop in pH indicating that the consumption of ammonium hydroxide is substantially complete and that a stoichiometric amount of cyanogen halide and alkali metal hydroxide has been added. During the course of the reaction, precipitation of the dicyanamide will occur but it is not necessary to remove it before the end of the reaction as good yields of high purity are obtained without such removal. The overall reaction can best be expressed as follows:

$$2NH_4OH + 2CNX + 2MOH \rightarrow MN(CN)_2 + MX + NH_4X + 4HOH$$

where X is a halogen such as chloride or bromide and M is sodium or potassium.

At the completion of the reaction the reaction mass is cooled below about 10° C. and more preferably about −5° C. to precipitate out the desired alkali metal dicyanamide. This is then separated by filtration with the filter cake comprising the desired product. The unwanted alkali metal halide and ammonium halide remaining in solution are carried away with the filtrate. The filter cake is then further purified by washing with a moderate amount of a suitable solvent such as acetone or methanol which has been cooled to about 5° C. The washed cake is then dried in an oven at moderate temperatures of about 55° C. to 100° C. Generally the crude dried product is suitable for use without further purification such as recrystallization.

The advantages of this invention are the simplicity and availability of the starting materials and the wide range of temperatures at which the reaction can be initiated and carried out. A further advantage is that the pH of the reacting mass does not need to be controlled or held between any prescribed limits as the pH is self-regulating provided that the alkali metal hydroxide is fed in approximately equal molecular ratio to the cyanogen halide. This ratio, while not critical to the reaction, is important because a significantly lower rate of addition of the alkali metal hydroxide relative to the halide favors the formation of unwanted end products of a nitrogenous nature while a significantly higher relative rate of addition of the alkali metal hydroxide will cause deterioration of the dicyanamide to sodium carbonate. In both cases a loss of yield and purity results. The concentration of the alkali metal hydroxide is not critical. It has been found, however, that the more concentrated solutions are better as dilute solutions carry more water into the reaction mass and the dicyanamides being water soluble are partially carried away in the filtration. In practice it has been found desirable to balance the amount of water present at the end of the reaction with the final cooling step so that only enough water is present to carry away the alkali halide formed in the reaction. This minimizes losses of product due to solubility.

All cyanogen halides should undergo this reaction and since the halide does not appear in the final product, it is not material or important which one is used. Of the available cyanogen halides cyanogen chloride is preferred because it is economically available in large quantities, but cyanogen bromide, cyanogen fluoride and cyanogen iodide can be used for small quantity preparations. The cyanogen halide need not be purified from any excess halide, but for obvious reasons a cyanogen halide essentially free from excess halide will make more economical use of the other starting materials. The excess halide will react with the ammonium hydroxide present and pass away with the final filtrate. Any available grade of alkali metal hydroxide and aqueous ammonium hydroxide may be used, but those grades containing iron or iron compounds should be avoided. Iron or its compounds will be converted to ferric chloride which appears as an undesirable colored contaminate that is difficult to remove from the final product.

The use of potassium hydroxide leads to the formation of the corresponding potassium dicyanamide but this product is insoluble in most solvents and is of limited utility. Lithium hydroxide has such low solubility in water that the large amount of water carried into the reaction would dissolve a large amount of the product. Further, since the alkali dicyanamide is generally further reacted at the site of the alkali atom, which is generally lost in the subsequent reactions, the dicyanamide of lithium does not appear to have commercial utility.

The following examples will illustrate the novel embodiments of the present invention. They are not to be taken as limiting and all parts, unless otherwise stated, are parts by weight.

Example 1 (Ref. N79-83)

To a suitable reaction vessel equipped with an adjustable speed stirrer was added a solution containing 310 parts of $NH_4OH$ and 426 parts of HOH. The solution was cooled to about 0° C. and cyanogen chloride was bubbled into the bottom of the vessel, with stirring, through an inlet pipe. A solution containing 320 parts of sodium hydroxide and 320 parts of water was added, dropwise, concurrently with the cyanogen chloride over a period of about 3½ hours. The rate of addition of cyanogen chloride was controlled so that the temperature of the reaction mass did not rise above 30° C. A total of 550 parts of cyanogen chloride was added. The pH of the reaction varied from about 13.4 pH at the start to about 10.4 pH at the end. The resultant slurry was cooled to about 5° C. before filtering. The filter cake was washed with about 250 parts of acetone cooled to about 0° C. The washed cake was placed in an oven at about 55–60° C. overnight for drying.

Two hundred and sixty-two parts of crude dried product was recovered from the washed and dried cake, with a purity of 50% sodium dicyanamide. The net yield based on the cyanogen chloride fed 33%.

Example 2 (Ref. N79-85)

Following the procedure and using the equipment as outlined in Example 1 there was fed into a solution of ammonium hydroxide containing 310 parts of ammonium hydroxide and 290 parts of water, an alkali solution of 470 parts of potassium hydroxide and 520 parts of water concurrently with a total of 355 parts of cyanogen chloride. The pH dropped from about 13.9 pH at the start to about 10.9 pH during the course of the experiment. The washed, dried filter cake product consisted of 201 parts to give a gross yield based on cyanogen chloride of 67%.

Example 3 (Ref. N79-93)

Following the procedure and using the equipment as outlined in Example 1, an alkali solution of 50 parts of sodium hydroxide and 80 parts of water was fed concurrently with 100 parts of cyanogen bromide vapor into a solution of ammonium hydroxide containing 51.5 parts of ammonium hydroxide and 48.5 parts of water. To prevent resolidification of the cyanogen bromide in the feed pipe the reaction mass was allowed to warm up to between about 22° C. to 35° C. The pH dropped from about 11.8 pH to 9.0 pH. The washed, dried product consisted of 42 parts containing 73% sodium dicyanamide. The net yield based on the cyanogen bromide fed was 73%.

Example 4 (Ref. N79-127)

To a suitable reaction vessel was added a solution containing 734 parts of ammonium hydroxide and 523 parts of water. The solution was cooled to about 0° C. and cyanogen chloride was introduced therein through an inlet pipe, with stirring. A solution of sodium hydroxide containing 50 parts of sodium hydroxide to 50 parts of water was introduced concurrently with the cyanogen chloride solution, the rate of sodium hydroxide addition being the ratio of about 1 mol of sodium hydroxide to 1 mol of cyanogen chloride. Over a period of about 6 hours 800 parts of sodium hydroxide solution and 670 parts of cyanogen chloride were added to the vessel at proportionate rates. The pH at the end of the experiment was allowed to fall to about 5.6 pH by the addition of a small excess amount of cyanogen chloride, without apparent adverse effect.

The reaction mass was cooled to about 0° C. before filtration, and then filtered. The crude filter cake was washed with about 1200 parts of acetone cooled to about 0° C. and the washed cake was dried in an oven at about 110° C. for about 60 hours. The dried product recovered was 450 parts of material containing 53% sodium dicyanamide. The net yield based on the cyanogen chloride fed was 49%.

I claim:
1. The process for direct preparation of an alkali metal salt of dicyanamide which comprises reacting together, in aqueous media ammonia, a cyanogen halide and an alkali metal hydroxide in about equal molecular proportions and at a temperature between about 0° C. and about 35° C.
2. The process according to claim 1, in which the cyanogen halide is cyanogen chloride.
3. The process according to claim 1, in which the cyanogen halide is cyanogen bromide.
4. The process according to claim 1, in which the alkali metal hydroxide is sodium hydroxide.
5. The process according to claim 1, in which the alkali metal hydroxide is potassium hydroxide.
6. The process according to claim 1, wherein the reaction mass is cooled, at the completion of the reaction, to a temperature between about −5° C. and about 10° C. to precipitate out the alkali metal dicyanamide.
7. The process according to claim 6, together with the steps of separating the alkali metal dicyanamide from the cooled mass by filtration, washing the filter cake with a solvent for inorganic impurities therein, and then drying the filter cake.

References Cited

UNITED STATES PATENTS 3,052,517  9/1962  Gilbert _____ 23—78
3,279,885  10/1966  Sprague et al. _____ 23—190

OSCAR R. VERTIZ, Primary Examiner.

L. A. MARSH, Assistant Examiner,